Nov. 7, 1961   R. J. GALES   3,007,752
BEARING SEAL ASSEMBLY
Filed June 2, 1958

INVENTOR.
R. J. GALES
BY J. H. Bower
ATTORNEY 3,007,752
BEARING SEAL ASSEMBLY
Richard J. Gales, Morrisville, Pa., assignor, by mesne assignments, to Ex-Cell-O Corporation, Detroit, Mich.
Filed June 2, 1958, Ser. No. 739,339
4 Claims. (Cl. 308—187.2)

This invention relates in general to bearing assemblies of the type that include an inner race ring and an outer race ring having rollers between them, and means for sealing off the space between the outer and inner race rings which move relative to each other. Bearings of this nature are now widely used, especially in aircraft.

So-called sealed bearings of this character are presently constructed in such a manner that the seal between the relatively moving parts causes considerable frictional contact. This friction causes the bearing to drag. Also, the coefficient of static friction is extremely high and may in some instances cause a sliding of the bearing rather than a rolling movement when the bearing is used in a cam follower application.

It is therefore a prime object of my invention to provide a sealed roller bearing of the type hereinbefore referred to which shall include novel and improved features of a sealing structure such that the two relatively moving members of the bearing have a contact seal, although they produce a minimum of friction during relative movement and have a low coefficient of static friction.

A further object of this invention is to provide such a sealed roller bearing wherein the sealing arrangement will retain the lubrication within the bearing.

A further object is to provide a bearing which will prevent foreign matter from entering between the relatively two moving members; and to obtain other advantages and results as will be brought out by the following description in conjunction with the accompanying drawings in which.

Figure 1:
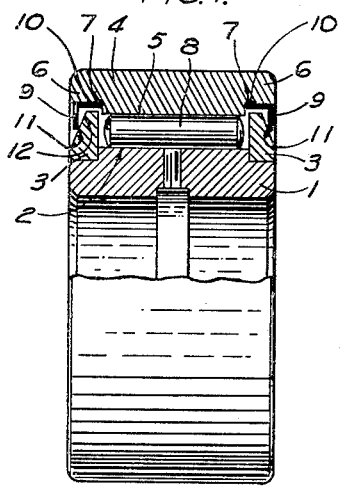
FIG. 1 is a vertical longitudinal sectional view of the line 1—1 of FIG. 2.
Figure 2:
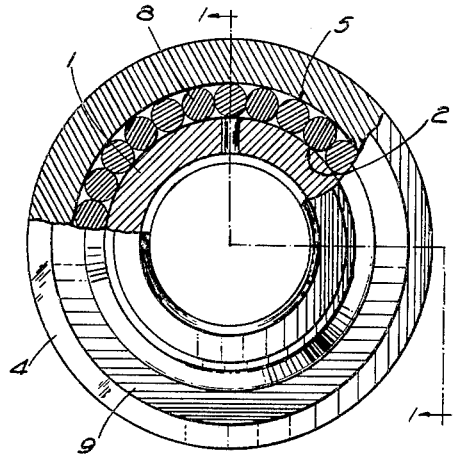
FIG. 2 is an end elevation view of a sealed roller bearing embodying my invention with portions broken away and shown in section.

Specifically describing the invention, the sealed bearing includes an inner race 1 which has a cylindrical raceway 2. Attached by frictional or other means to said inner race ring is a retaining flange 3 at each end of the raceway 2.

An outer race ring 4 surrounds the inner race ring 1 and has a cylindrical raceway 5 which is of a diameter less than that of the outer peripheries of the flanges 3 of the inner race ring. Said outer race ring 4 also contains flange 6. The cross-section of the seal 9 could be of having a seal containing snap groove 7 therein.

Rollers 8 are arranged in the raceway and interposed between the race rings so that the ends of the rollers may have loose abutting contact with the inner sides of the roller retaining flanges 3.

The seal 9 is preferably made of a semi-flexible material, such as nylon, and has a snap-in ridge or ring 10 which fits into the undercut or snap groove 7 on the flange 6. The cross-secton of the seal 9 could be of various shapes; however, for the specific description of the invention disclosed herein, an L-shaped seal is used as shown in FIGS. 1, 3, 4 and 5. In this manner the seal is held in position while in point contact 11 frictional contact with flange 3. To provide for wear on the seal, the angle 12 on the flange 3 is so arranged that the seal is put under slight spring tension so that as the point contact 11 on the seal wears, the slight spring tension will always provide for actual physical contact between the seal and flange 3. Also, as the seal wears, the spring action will diminish, while the semi-flexible seal point contact becomes more of a surface contact. The surface contact naturally increases the frictional load and the coefficient of static friction, although the spring contact is reduced, therefore, each tends to balance the other, causing no appreciable change in friction while still maintaining a proper seal. It is to be noted that in actual practice the amount of wear on the seal is extremely small, even after long usage.

Figure 3:
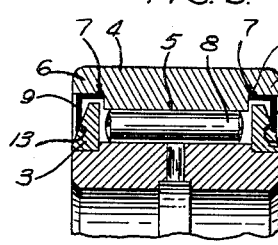
FIG. 3 is a fragmentary view similar to FIG. 1 showing a modification of the invention.
Figure 5:
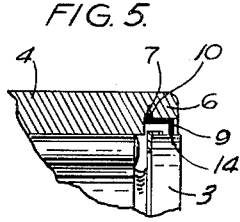
FIG. 5 is a view similar to FIG. 3 showing a further modification of the sealed roller bearing.

In instances where minimum frictional contact is not of as great importance, a surface type seal may be used, such as shown in FIGS. 3 and 5 at seal surface 13 and 14 respectively. In either the surface type seal or the point contact seal, lubrication may be maintained within the bearing members without leakage to the outside surfaces. Also, foreign matter, and particularly salt spray, are kept from entering the internal portion of the bearing.

It is understood that instead of using a nylon type seal, other sealing materials may be used, such as teflon, rubber, or various other plastic materials. It is also to be understood that the seal may be reversed so that the seal retainer is constructed on the inner flange 3 and that the wiping or point contact of the seal is on the outer race ring flange 6. The structure would be substantially the same.

Figure 4:
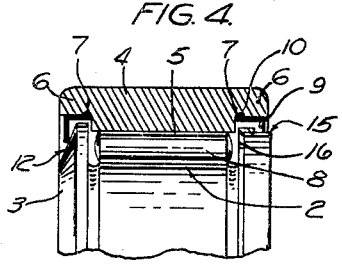
FIG. 4 is a view similar to FIG. 3 illustrating another form of the invention.

It is to be noted that in FIG. 4 I have shown a point contact seal 9 on a flat flange surface 15. In this type of bearing it is common to retain the outer race in place by a retaining ring 16. This retaining ring may be removed to provide disassembly and repair of the bearing. In this construction, the flat flange surface 15 is of less diameter than the outer race diameter 5, permitting the outer race to slip over flange surface 15 when the retaining ring 16 is removed.

Numerous other changes and modifications may be made in the form, construction and arrangement of the elements of the assembly. In view thereof it should be understood that the particular embodiments of the invention shown in the drawing and described above are intended to be illustrative only and not intended to limit the scope of the invention.

I claim as my invention:

1. A seal roller bearing assembly comprising an inner race ring having a raceway and coaxial roller retaining flanges at opposite ends thereof; an outer race ring having a raceway, said outer race ring surrounding said inner race ring and having integral thereto at each end of said outer race ring a flange of greater diameter than said outer race ring raceway; a complement of rollers located between and in engagement with said races and between said flanges; sealing means between said inner race flanges and outer race flanges allowing relative movement therebetween, said sealing means consisting of a semi-flexible ring having a generally L-shaped cross-section, and said sealing means contacting the roller retaining flanges at inclined angles providing point contact between the seal means and the roller retaining flanges.

2. A roller bearing assembly comprising an inner race ring having a race with radially extending flanges at each end thereof; an outer race ring having a race with longitudinal extending flanges of greater diameter than the said outer race ring and located at opposite ends thereof, one of said radially extending flanges having a diameter less than the diameter of the race of said outer race ring, the other radially extending flange having a diameter greater than the race of the said outer race ring and smaller than the end flange of the outer race ring; a complement of rollers in engagement with said races and located between said flanges; and semi-flexible ring seals between said radial flanges and said longitudinal flanges, said longitudinal flanges containing seal retaining grooves for holding said seal rings in place; and means to retain the outer race in place.

3. In combination according to claim 2, said means to retain including a removable retaining ring.

4. In combination according to claim 2, said seal rings generally having an L-shaped cross-section, said seal ring engaging radially extending flange having a diameter greater than the race of the outer race ring and contacting the said flange at an inclined angle providing point contact between the said seal ring and the said flange; and said other seal ring engaging radially extending flange having a diameter less than the diameter of the race of said outer race ring and contacting the said flange with the seal ring contacting tip formed to an edge providing point contact between the said seal ring and said flange.

References Cited in the file of this patent

UNITED STATES PATENTS

| | | |
|---|---|---|
| 2,277,810 | Zotter | Mar. 31, 1942 |
| 2,621,091 | Hickling | Dec. 9, 1952 |
| 2,734,757 | Martin | Feb. 14, 1956 |
| 2,755,113 | Baumheckel | July 17, 1956 |
| 2,764,433 | Cobb | Sept. 25, 1956 |
| 2,770,508 | Smith | Nov. 13, 1956 |
| 2,819,100 | Peterson | Jan. 7, 1958 |
| 2,830,858 | Moorman | Apr. 15, 1958 |
| 2,838,349 | Maas | June 10, 1958 |
| 2,845,285 | Cobb | July 29, 1958 |

FOREIGN PATENTS

| | | |
|---|---|---|
| 1,020,499 | Germany | Dec. 5, 1957 |